US012703335B2

(12) United States Patent
Chidambaram et al.

(10) Patent No.: US 12,703,335 B2
(45) Date of Patent: Aug. 11, 2026

(54) BRAKING ARRANGEMENT AND METHOD FOR ADJUSTING BRAKE PRESSURE IN A BRAKING ARRANGEMENT INCLUDING AN ANTI-LOCK BRAKE SYSTEM

(71) Applicant: VOLVO TRUCK CORPORATION, Gothenburg (SE)

(72) Inventors: Subramanian Chidambaram, Greensboro, NC (US); Lance Woodsend, High Point, NC (US); Gabriel Einstoss, Raleigh, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/728,881

(22) PCT Filed: May 11, 2022

(86) PCT No.: PCT/US2022/028674
§ 371 (c)(1),
(2) Date: Jul. 14, 2024

(87) PCT Pub. No.: WO2023/219609
PCT Pub. Date: Nov. 16, 2023

(65) Prior Publication Data

US 2025/0083652 A1 Mar. 13, 2025

(51) Int. Cl.
*B60T 8/00* (2006.01)
*B60T 8/171* (2006.01)
(Continued)

(52) U.S. Cl.
CPC .......... *B60T 8/17636* (2013.01); *B60T 8/171* (2013.01); *B60T 8/172* (2013.01); *B60T 2210/12* (2013.01)

(58) Field of Classification Search
CPC ...... B60T 8/17636; B60T 8/171; B60T 8/172; B60T 2210/12; B60T 13/662; B60T 17/22; B60T 8/36; B60T 8/50; B60T 13/683
See application file for complete search history.

(56) References Cited

U.S. PATENT DOCUMENTS 4,009,640 A 3/1977 Takeuchi et al.
4,166,655 A 9/1979 Spero
(Continued)

FOREIGN PATENT DOCUMENTS

CN 102052299 A 5/2011
WO 9216400 A1 10/1992

OTHER PUBLICATIONS

International Search Report (Sep. 6, 2022) for corresponding International App. PCT/US2022/028674.
(Continued)

*Primary Examiner* — Ian Jen
(74) *Attorney, Agent, or Firm* — Withrow & Terranova, PLLC

(57) ABSTRACT

A braking arrangement for a vehicle includes a source of pressurized air for supplying pressurized air, a wheel comprising a tire and a first pneumatic brake arrangement, the first pneumatic brake arrangement including a brake chamber and a brake, an anti-lock brake valve in a line between the brake chamber and the source of pressurized air, the anti-lock brake valve opening to connect the brake chamber to the source of pressurized air and closing to disconnect the brake chamber from source of pressurized air, and an electronic control unit configured to open and close anti-lock brake valve during an anti-lock braking operation, the electronic control unit being configured to set or adjust a rate at which pressure in the brake chamber is increased during anti-lock braking operation by adjusting opening timing of (Continued)

anti-lock brake valve. A method for changing performance of a braking arrangement for a vehicle is also provided.

22 Claims, 11 Drawing Sheets

(51) Int. Cl.
*B60T 8/172* (2006.01)
*B60T 8/1763* (2006.01)

(56) References Cited

U.S. PATENT DOCUMENTS 4,229,051 A 10/1980 Mekosh, Jr. et al.
4,668,024 A * 5/1987 Nakanishi ............. B60T 8/3645 251/117
4,738,491 A 4/1988 Sato
4,861,118 A 8/1989 Burckhardt et al.
5,001,639 A * 3/1991 Breen ..................... B60T 17/22 303/123
5,022,714 A * 6/1991 Breen ..................... B60T 8/323 188/112 A
5,033,798 A * 7/1991 Breen ..................... B60T 13/66 188/112 A
5,152,544 A * 10/1992 Dierker, Jr. ........ B62D 53/0871 280/446.1
5,480,221 A * 1/1996 Morita .................... B60T 8/328 303/113.5
5,538,334 A * 7/1996 Kushi ..................... B60T 8/348 303/113.5
5,584,541 A * 12/1996 Sone ....................... B60T 8/175 303/146
6,122,585 A * 9/2000 Ono ........................ B60T 8/445 303/166
6,302,241 B1 10/2001 Gronowicz, Jr.
6,622,077 B2 9/2003 Ruhnau et al.
6,935,707 B2 8/2005 Ruhnau et al.
7,074,160 B1 * 7/2006 Inoue .................... B60W 10/04 477/80
9,321,438 B2 4/2016 Ezoe et al.
9,346,440 B2 5/2016 Miller, Jr.
10,953,887 B2 3/2021 Magnusson et al.
11,198,421 B2 12/2021 Eckert
2001/0032045 A1 * 10/2001 Hano ...................... B60T 8/172 701/80
2008/0269994 A1 10/2008 Karlsson et al.
2010/0001577 A1 * 1/2010 Hatano ................. B60T 8/4081 303/3
2013/0038062 A1 2/2013 Salu
2015/0158471 A1 6/2015 Ezoe et al.
2018/0201245 A1 * 7/2018 Kamiya .................... B60T 8/00
2019/0047527 A1 2/2019 Falconer et al.
2019/0193695 A1 * 6/2019 Ninoyu ................. B60T 17/222
2020/0180576 A1 6/2020 Motoyama et al.
2021/0171004 A1 6/2021 Han
2022/0073043 A1 * 3/2022 Amamoto ............. B60T 8/3255

OTHER PUBLICATIONS

International Preliminary Report on Patentability (Nov. 22, 2023) for corresponding International App. PCT/US2022/028674.
Bera, K. et al. "Evaluation of antilock braking system with an integrated model of full vehicle system dynamics," Simulation Modelling Practice and Theory, vol. 19, No. 10, Nov. 2011, pp. 2131-2150.
Extended European Search Report for European Patent Application No. 22940949.5, mailed Apr. 22, 2026, 7 pages.

* cited by examiner 33A
41
ABS
VALVE
OPEN
43
33B
PS
PS
BRAKE
CHAMBER
31'
39

33A
41
W
PB
PS
ABS
VALVE
CLOSED
43
33B
PE
BRAKE
CHAMBER
31'
39

33A
41
PS
W
PB
PD
ABS
VALVE
CLOSED
43
33B
PE
BRAKE
CHAMBER
31'
39

57
33A
41
W
PB
ABS
VALVE
CLOSED
43
33B
PE
BRAKE
CHAMBER
31'
39

33A
41
PS
ABS
VALVE
OPEN
43
33B
W
PB
BRAKE
CHAMBER
31'
39

33A
41
43
33B
PS
ABS
VALVE
OPEN
PS
BRAKE
CHAMBER
31'
39

33A
41
43
33B
PS
W
PB
ABS
VALVE
CLOSED
PE
BRAKE
CHAMBER
31'
39

33A
41
43
33B
PS
W
PB
PD
ABS
VALVE
CLOSED
PE
BRAKE
CHAMBER
31'
39

33A
41
43
33B
PS
ABS
VALVE
OPEN
PD
BRAKE
CHAMBER
31'
39

BRAKING ARRANGEMENT AND METHOD FOR ADJUSTING BRAKE PRESSURE IN A BRAKING ARRANGEMENT INCLUDING AN ANTI-LOCK BRAKE SYSTEM

This application is a 35 USC 371 national phase filing of International Application No. PCT/US2022/028674, filed May 11, 2022, the disclosure of which is incorporated herein by reference in its entirety.

BACKGROUND AND SUMMARY

The present invention relates to braking arrangements and methods for anti-lock brake systems and, more particularly, to such arrangements and methods wherein braking pressure can be adjusted.

FIG. 1, from T. K. Bera, K. Bhattacharya, A. K. Samantaray, *Evaluation of antilock braking system with an integrated model of full vehicle system dynamics*, Simulation Modelling Practice and Theory, Volume 19, Issue 10, November 2011, Pages 2131-2150. https://doi.org/10.1016/j.simpat.2011.07.002, shows a conventional graph of coefficient of friction versus slip ratio for tires on different surfaces. A slip ratio of zero is a free rolling tire, while a slip ratio of 1 is a tire that has lost traction. It is ordinarily desirable to operate the vehicle to maximize the coefficient of friction for all surfaces, typically by maintaining a slip ratio in a range such as the illustrated "sweet spot". Nonetheless, for optimal road conditions, such as dry asphalt, the greatest coefficient of friction will tend to occur when the slip ratio is higher than when driving on less favorable conditions, such as wet asphalt or snow. Ordinarily, operation at slip ratios to the right of the maximum coefficient of friction under particular circumstances (generally a negative slope) is considered to involve "unstable" operation and operation at slip ratios to the left of the maximum is considered to involve "stable" operation.

Braking arrangements including anti-lock braking systems (ABS) for pneumatic brakes of vehicles are well known. A source of pressurized air is connected to a pneumatically operated brake on a wheel through a line that is opened or closed by, e.g., operation of a brake pedal, a relay valve, or an electronically controlled pressure valve (EPV) to open or close a valve in the line. To prevent the brake from locking the wheel, an electronic control unit (ECU) rapidly opens and closes flow communication between the source of pressurized air and the brake via an anti-lock brake valve (ABV) downstream of the brake pedal (or a relay valve) or EPV. In a typical ABS, when the ECU determines that the wheels are in danger of locking, i.e. slippage is above a predetermined level, the ABV closes flow communication between the source of pressurized air and the brake, an exhaust in the ABV opens to release pressure between the ABV and the brake, and the brake is released. When slippage falls to a certain level, the ABV reopens and the brake chamber is pressurized again. This rapid opening and closing of the ABV assists in avoiding locking up of the wheel while rapidly stopping and permitting better steering control of the vehicle.

ABS systems may be designed to address conditions of better than normal wheel slippage/tire-road friction or worse than normal wheel slippage/tire-road friction. In such systems, when conditions of better than normal wheel slippage/tire-road friction are present, it may be desirable to have a higher rate of pressure increase in the brake chamber than normal because the tire can handle high braking forces. Similarly, when there are conditions of worse than normal wheel slippage/tire-road friction, it may be desirable to have a lower rate of pressure increase in the brake chamber than normal because there may be insufficient friction between the tire and the road surface to generate high braking forces. In conventional ABS systems, opening and closing of the ABV occurs as a function of measured slippage. In such conventional systems, cycling frequency of the ABV may be non-optimal for the particular conditions. Due to non-optimal cycling frequency, braking force tends to be lost which, in turn, tends to result in a longer stopping distance than occurs during normal, optimal operation.

It is desirable to provide a braking arrangement and method including an anti-lock brake system that permits optimization of the cycling frequency of an ABV, such as for different driving conditions.

It is desirable to provide a braking arrangement and method including an anti-lock brake system that can boost and/or reduce the rate at which pressure is supplied to a pneumatic brake during an anti-lock braking operation.

The inventors have recognized that cycling frequency or rate at which pressure increases and decreases downstream of the ABV (particularly in the brake chamber) in an ABS can be adjusted by altering the rate at which a pneumatic brake is pressurized during an anti-lock braking operation. For example, the inventors have recognized that, in certain circumstances, such as when there is minimal wheel slippage/high coefficient of friction between the vehicle's tires and the road surface, it may be desirable to increase the rate at which pressure is supplied to a brake during the beginning of braking or reopening of an ABV. In this way, it may be possible to more quickly stop a vehicle by performing a maximum number of braking cycles during an anti-lock braking operation as there is less risk of the wheels locking via normal operation. Similarly, the inventors have recognized that, when there is more wheel slippage than is desirable/low coefficient of friction between the vehicle's wheels and the road surface, it may be desirable to minimize the rate at which pressure is supplied to the brake during an anti-lock braking operation to avoid excessive premature cycling of the ABV as the range of slip ratios over which friction is optimized is narrow and there may be more risk of the wheels locking if pressure is supplied too rapidly as wheel slip may enter an unstable region before the controller detects this fact.

In accordance with an aspect of the present invention, a braking arrangement for a vehicle comprises a source of pressurized air for supplying pressurized air, a wheel comprising a tire and a first pneumatic brake arrangement, the first pneumatic brake arrangement including a brake chamber and a brake, an anti-lock brake valve (ABV) in a line between the brake chamber and the source of pressurized air, the ABV opening to connect the brake chamber to the source of pressurized air and closing to disconnect the brake chamber from the source of pressurized air; and an electronic control unit (ECU) configured to open and close the ABV during an anti-lock braking operation, the ECU being configured to set or adjust a rate at which pressure in the brake chamber is increased during the anti-lock braking operation by adjusting opening timing of the ABV.

In accordance with another aspect of the present invention, a method for changing performance of a braking arrangement for a vehicle, the vehicle and braking arrangement comprising a source of pressurized air for supplying pressurized air, a wheel comprising a tire and a first pneumatic brake arrangement, the first pneumatic brake arrangement including a brake chamber and a brake, and an anti-lock brake valve (ABV) in a line between the brake chamber and the source of pressurized air, the ABV opening to connect the brake chamber to the source of pressurized air and closing to disconnect the brake chamber from the source of pressurized air, is provided and comprises opening and closing the ABV during an anti-lock braking operation to supply and stop supplying, respectively, air from the source of pressurized air to the brake chamber, and adjusting a rate at which pressure in the brake chamber is increased during the anti-lock braking operation by adjusting opening timing of the ABV.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 2:
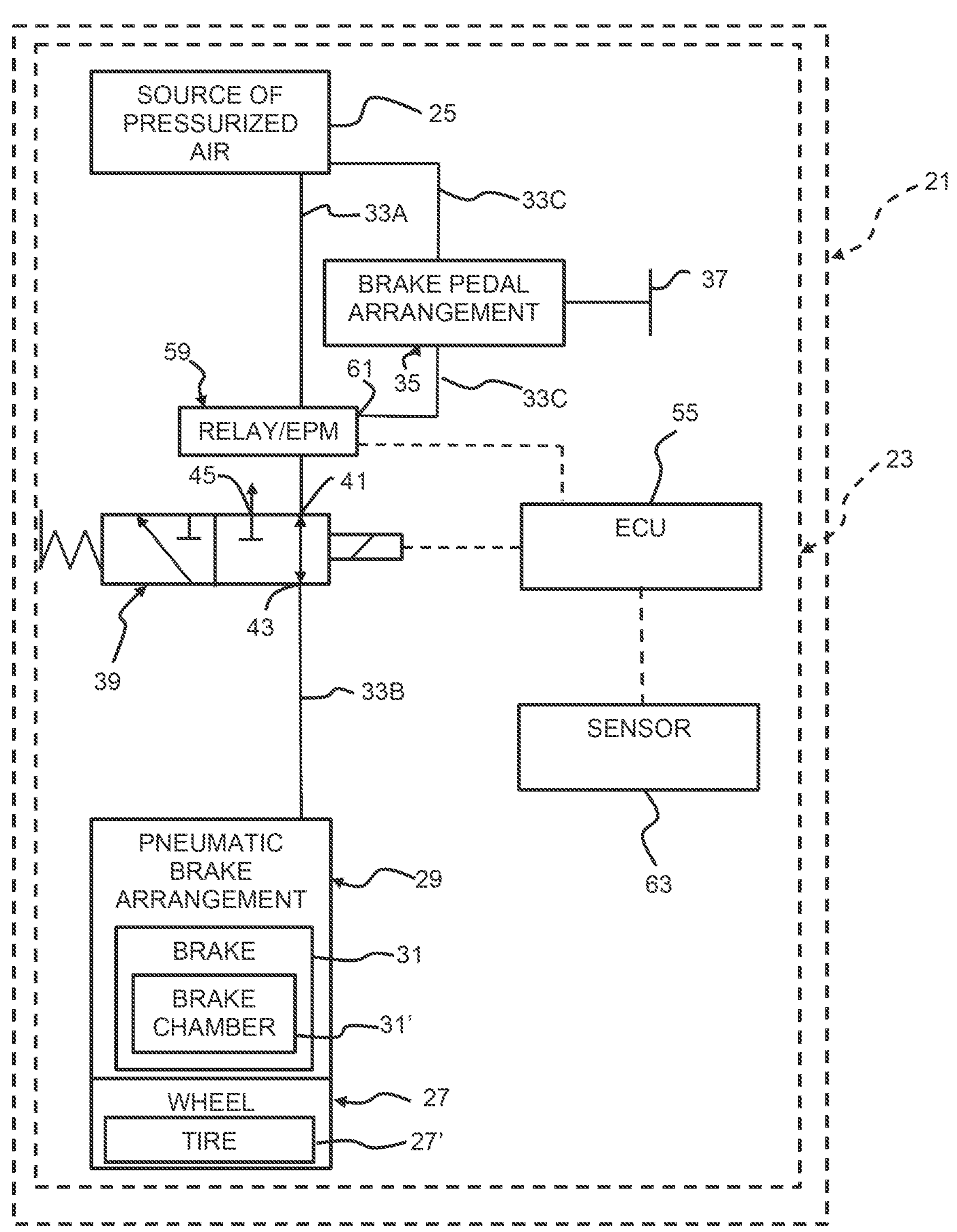
FIG. 2 schematically shows a braking arrangement according to an aspect of the present invention.

A vehicle 21 comprising a braking arrangement 23 according to an aspect of the present invention is shown schematically in FIG. 2. The braking arrangement 23 includes an anti-lock braking system (ABS) and comprises a source of pressurized air 25 such as a compressor and/or a tank of compressed air. The vehicle 21 and, ordinarily, the braking arrangement 23 include a wheel 27 and a pneumatic brake arrangement 29 including a brake 31 with a brake chamber 31'. The wheel 27 includes a tire 27'. The brake 31 is arranged to be engaged when the brake chamber 31' is connected via a line 33A and 33B to the source of pressurized air 25 and disengaged when the brake chamber is disconnected from the source of pressurized air.

The braking arrangement 23, in an illustrative embodiment, includes a structure, such as a brake pedal arrangement 35, for opening and closing flow communication through a line 33C between the source of pressurized air 25 and a pneumatic control port 61 of a relay valve or electronically controlled pressure valve (EPV) 59 that is disposed between the source of pressurized air and the brake 31. In the illustrative embodiment, the brake pedal arrangement 35 is configured to pressurize the pneumatic control port 61 on the relay valve or EPV 59 via the line 33C when the brake pedal 37 is depressed. When the pneumatic control port 61 is pressurized, the relay valve or EPV 59 opens and the source of pressurized air 25 is opened for delivery of pressurized air to the brake 31. When the brake pedal 37 is released, flow communication between the source of pressurized air 25, pressure drops at the pneumatic control port 61, and the relay valve or EPV 59 closes to close flow communication between the source of pressurized air and the brake.

The braking arrangement 23 includes an anti-lock brake valve 39 (ABV) between the lines 33A (between the ABV and the source of pressurized air 25) and 33B (between the ABV and the pneumatic brake arrangement 29). A typical ABV 39 of a type suitable for use in connection with the present invention comprises an inlet port 41 closest to the source of pressurized air 25, an outlet port 43 closest to the brake 31, and an exhaust port 45. The ABV 39 is open when the inlet port 41 and the outlet port 43 are open, the exhaust port 45 is closed, and flow is permitted between the inlet port and the outlet port, and the ABV is closed when the inlet port is closed, the exhaust port and the outlet port are open, and flow is permitted between the exhaust port and the outlet port. The ABV 39 is typically a solenoid valve. In some circumstances, when the ABV 39 is closing, the exhaust port 45 may open before the ABV has fully closed.

The braking arrangement 23 includes an electronic control unit 55 (ECU) configured to open and close the ABV 39 to supply and stop supplying, respectively, air from the source 25 of pressurized air at an initial steady state pressure PSI or, after closure of the ABV, a subsequent steady state pressure PSS (FIG. 1A) to the brake chamber 31'. The ECU 55 may also control the relay valve or EPV 59.

FIGS. 3A-3B, 5A-5B, 7A-7B, 9A-9B, and 11A-11B are graphs provided to illustrate what happens to pressure over time upstream and downstream of the ABV 39 during closing (and, for FIGS. 5A-5B, 7A-7B, 9A-9B, and 1I A-11B, during reopening of the ABV). It will be understood that these graphs are intended solely for purposes of illustration of concepts being discussed and are not intended to represent actual measurements of pressure over time. Similarly, the schematic views in FIGS. 4A-4D, 6A-6C, 8A-8E, and 10A-10D are provided merely to illustrate the concepts being discussed and are not intended to necessarily reflect all of the complex flow patterns that occur during opening and closing of an ABV.

Figures 3A, 3B:
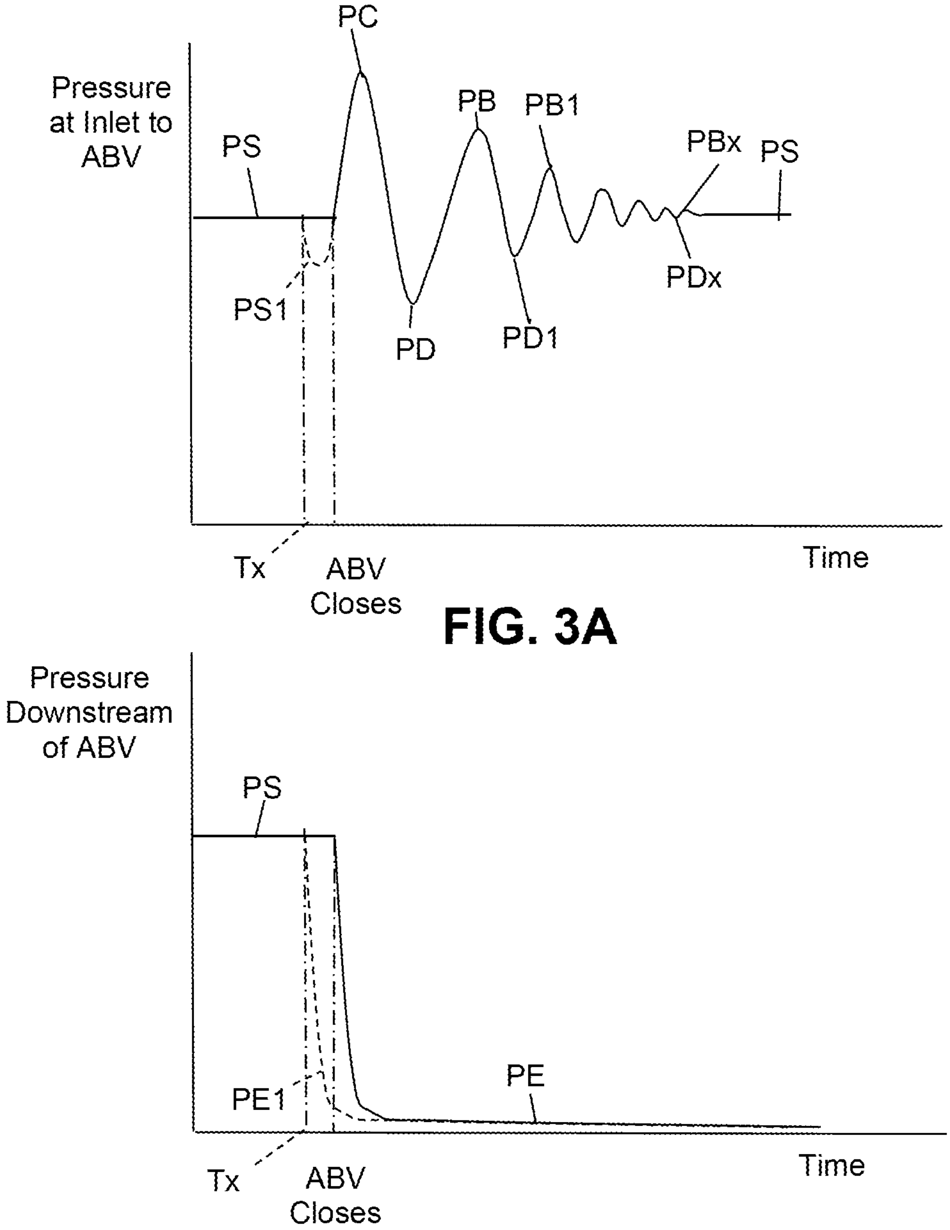
FIGS. 3A and 3B are graphs illustrating pressure versus time at the inlet of an ABV and in a line downstream of the ABV, respectively, upon closure of the ABV.

FIG. 3A is an illustration of roughly what occurs to the pressure over time at the inlet port 41 of the ABV 39 when the ABV closes. Initially, pressure is supplied at a pressure PS from the source of pressurized air 25. When the ABV 39 closes, there ordinarily tends to be a pressure surge at the inlet port 41 to PC as air supplied by the source of pressurized air 25 stops being able to pass through the ABV. The pressure surge is followed by a lower pressure PD below the pressure PS as a high pressure wave moves away from the inlet port 41 back upstream toward the source of pressurized air. This is followed by another pressure surge rising to a pressure PB above the pressure PS as the wave caused by closing the ABV 39 rebounds from some point 57 upstream of the ABV and returns to the inlet of the ABV. This is ordinarily followed by a further series of steadily decreasing pressure drops PD1 . . . PDx and pressure surges PB1 . . . PBx as waves continue to bounce off the ABV and some rebound point or points upstream of the ABV, the wave losing energy with each back-and-forth cycle, and the pressure at the inlet port 41 eventually returns to the pressure PS. The rebound point 57 may take any number of forms, such as a physical structure like a restriction or turn in the line 33A, a structure forming part of the brake pedal arrangement 35, or a structure forming part of the relay valve or EPV 59, however, the rebound point may merely be a position at which the wave W rebounds off pressurized air supplied from the source 25 of pressurized air.

FIG. 3B is an illustration of roughly what occurs to the pressure over time in the line 33B downstream of the ABV 39 when the ABV closes. Until the ABV 39 closes, the pressure in the line 33B is ordinarily equal to (or slightly lower due to, inter alia, pressure drop across the ABV) the pressure PS at the inlet port 41 to the ABV. When the ABV 39 closes, the exhaust port 45 opens and pressure in the line 33B falls to an exhausted pressure PE which may be atmospheric pressure or the pressure to any volume to which the exhaust port 45 opens.

While there may be pressure drop across the ABV 39 or other structures, it will be assumed for purposes of discussion of all illustrative examples herein that, when the ABV is open, pressure in the lines 33A and 33B is substantially equal at PS. Similarly, it will be assumed for purposes of discussion of all illustrative examples herein that pressure in the line 33B is substantially equal to the pressure in the brake chamber 31' and, when the line 33B is pressurized, the brake is engaged and, when the line 33B is exhausted through the exhaust port (FIG. 2) of the ABV, the brake is released.

In those arrangements in which, while the ABV 39 is still in the process of closing, the exhaust port 45 has already opened or is starting to open, there may be a pressure drop at the inlet port 41 to the ABV the instant that the ABV closes. This is illustrated in FIGS. 3A and 3B by the ABV closing at time Tx after which the pressure at the inlet port 41 to the ABV 39 drops to pressure PS1 (shown along a dashed pressure versus time line) until the ABV completely closes and the pressure rises to PC due to closure of the ABV and generation of a wave, and the pressure downstream of the ABV in the line 33B falls along the dashed line PE1.

FIGS. 4A-4D schematically illustrate significant features of what is understood to happen in the line 33A upstream of the inlet port 41 of the ABV 39 and in the line 33B downstream of the outlet port 43 of the ABV as the ABV closes and then reopens at some later time. In FIGS. 4A-4D, closing of the ABV 39 can be understood to have occurred based on a determination that slippage is above a predetermined limit. Reopening of the ABV 39, may, however, be understood to be based solely on when slippage has been detected to be below another (but possibly the same) predetermined value, as in a conventional ABS system, or, as in the present invention, based on when slippage has been detected to be below another (but possibly the same) predetermined value together with specific timing of reopening based on pressure at the inlet port 41 of the ABS.

Figures 4A, 4B, 4C, 4D:
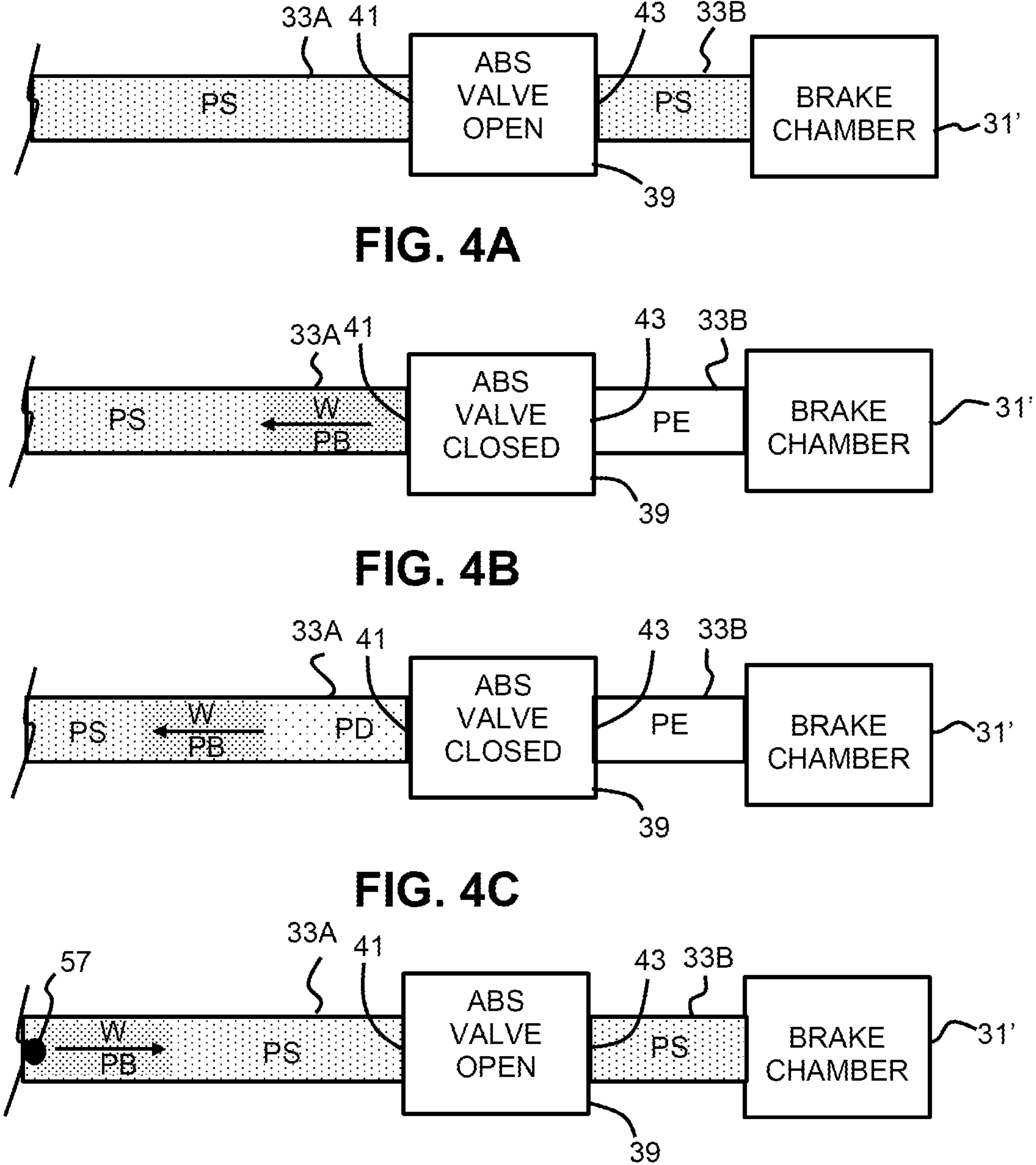
FIGS. 4A-4D schematically illustrate pressure wave movement in a braking arrangement according to an aspect of the present invention upon closure and reopening of an ABV.

FIG. 4A shows the ABV 39 before closing when pressure is being supplied to the brake chamber 31' from the source of pressurized air 25 at the pressure PS.

Figures 5A, 5B:
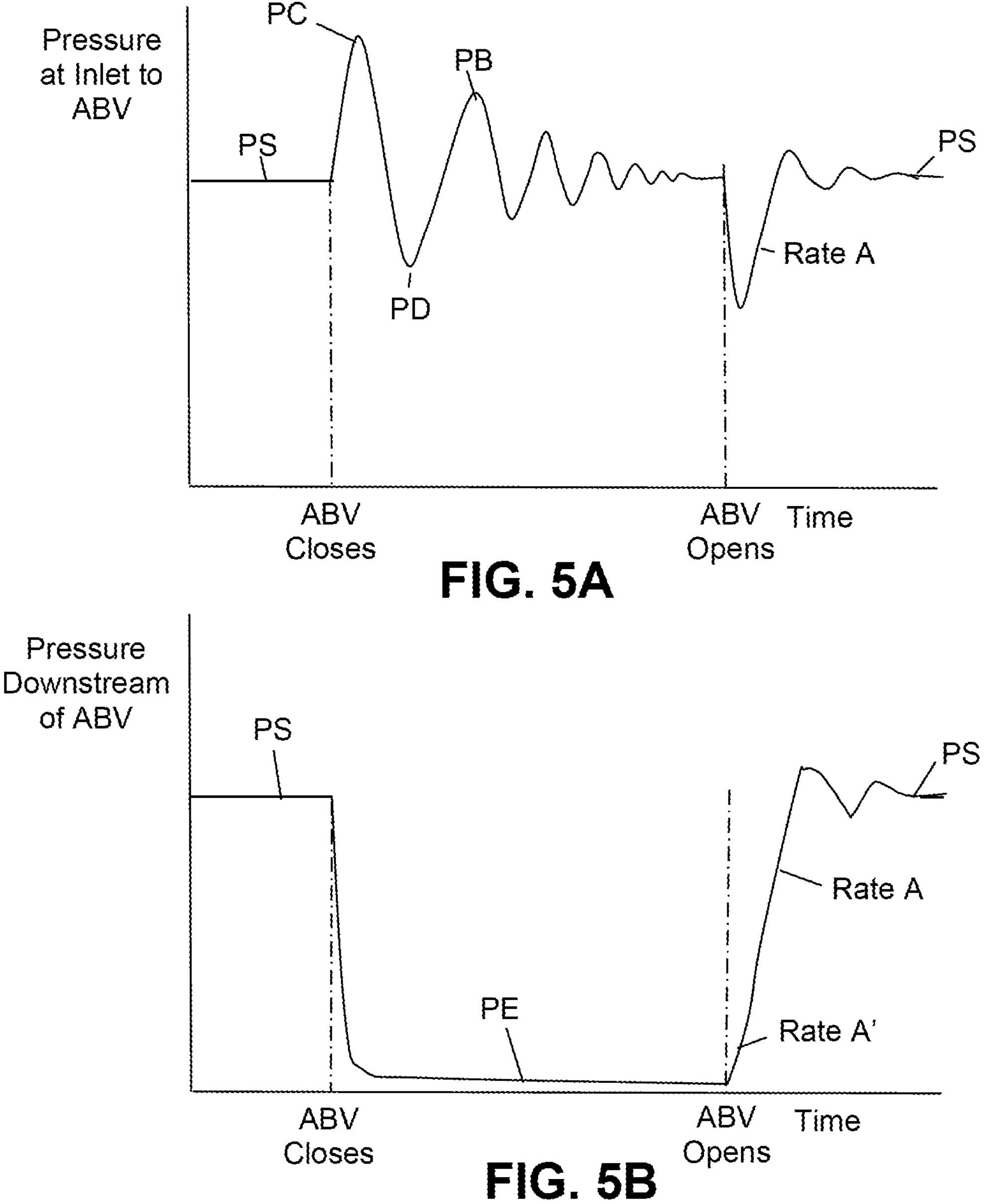
FIGS. 5A and 5B are graphs illustrating pressure versus time at the inlet of an ABV such as is shown in FIGS. 4A-4D and in a line downstream of the ABV, respectively, upon closure and reopening of the ABV.

FIG. 4B shows the ABV 39 after it has just closed. Upon closing of the ABV 39, a pressure surge occurs at the inlet port 41 of the ABV and causes the pressure at the inlet to rise to what shall be referred to as a closing pressure PC as seen in FIG. 5A. At the same time, the exhaust port 45 (FIG. 2) of the ABV 39 opens and pressure in the line 33B drops to what shall be referred to as an exhaust pressure PE as seen in FIG. 5B. PE may be but is not necessarily atmospheric pressure or the pressure to any volume to which the exhaust port 45 opens. The exhaust port 45 may, of course, only be open long enough to partially vent the line 33B. As seen in FIG. 4B, the increased pressure at the inlet port 41 of the ABV 39 causes a high pressure wave W to travel upstream in the line 33A toward the source of pressurized air 25 (FIG. 2) at a boosted pressure PB above PS, and pressure in the line 33B falls to PE. PB of the wave W may be equal to PC as it initially travels upstream but will ordinarily fall as time elapses.

FIG. 4C shows the ABV 39 as the wave W with boosted pressure PB continues to travel upstream in the line 33A. As the wave W moves away from the inlet port 41 of the ABV, a dip to pressure PD occurs at the inlet port as seen in FIG. 5A.

FIG. 4D shows the ABV 39 after it has reopened. The exhaust port 45 closes when or before the ABV 39 reopens. After reaching the rebound point 57 in the line 33A upstream of the inlet port 41 of the ABV 39, the wave W, still at a boosted pressure PB above PS, has rebounded and has started moving downstream toward the ABV again. When the wave W reaches the inlet port 41 of the ABV, it will still be at a boosted pressure PB as seen in FIG. 5A. If the ABV 39 remains closed, the wave W may bounce off the inlet port 41 of the ABV and head back upstream, causing another dip in pressure at the inlet of the ABV below PS, and subsequently rebound off of the same or a different rebound point and start returning downstream toward the inlet of the ABV. This back-and-forth movement of the wave W may continue for some time with the wave steadily losing energy until the boosted pressure of the wave is substantially equal to the pressure PS supplied by the source of pressurized air.

FIG. 4D shows the ABV 39 reopening at a time when pressure at the inlet port 41 of the ABV has settled down to substantially equal to PS, however, this is not necessarily always the case as, typically, in conventional ABS systems, reopening is based substantially solely upon a determination (e.g., by the ECU) that slippage has fallen below a predetermined level without regard to pressure at the inlet port. Thus, in conventional ABS systems, reopening of the ABV 39 occurs when pressure at the inlet port 41 of the ABV is equal to, above, or below the pressure PS supplied from the source of pressurized air 25 without regard pressure at the inlet port. In the present invention, however, reopening occurs after slippage is determined to have fallen below a predetermined level, but also at a precise time when pressure at the inlet port of the ABV is expected to be equal to the pressure PS from the source of pressurized air 25, or boosted or dipped relative to that pressure. FIG. 4D can, thus, be considered to illustrate an aspect of the invention wherein reopening has been intentionally timed to occur when pressure at the inlet port 41 to the ABV 39 has settled to pressure PS.

Upon reopening of the ABV 39, pressure in the line 33B downstream of the ABV rises to PS again as seen in FIG. 4D. As seen in FIG. 5A, upon reopening of the ABV 39, there is a pressure drop at the inlet port 41 of the ABV as the pressurized air rushes to the lower pressure region in the line 33B downstream of the ABV. As seen in FIG. 5B, when the ABV reopens, pressure in the line 33B downstream of the ABV starts to rise, initially at a rate A' up until the pressure in the line 33B is substantially equal to the pressure at the inlet port 41 of the ABV and, subsequently, at a rate A that is substantially at the same rate at which pressure rises at the inlet of the ABV. It will be appreciated that rates A' and A are not necessarily constant values but, for purposes of discussion, as they occur over very short periods of time, it will be considered that they are relatively constant. As seen in FIGS. 5A and 5B, after the ABV 39 has reopened, there will ordinarily be some pressure surges and dips at the inlet port 41 of the ABV and in the line 33B downstream of the ABV, with pressure eventually settling down to the pressure PS supplied by the source of pressurized air 25.

Figures 6A, 6B, 6C:
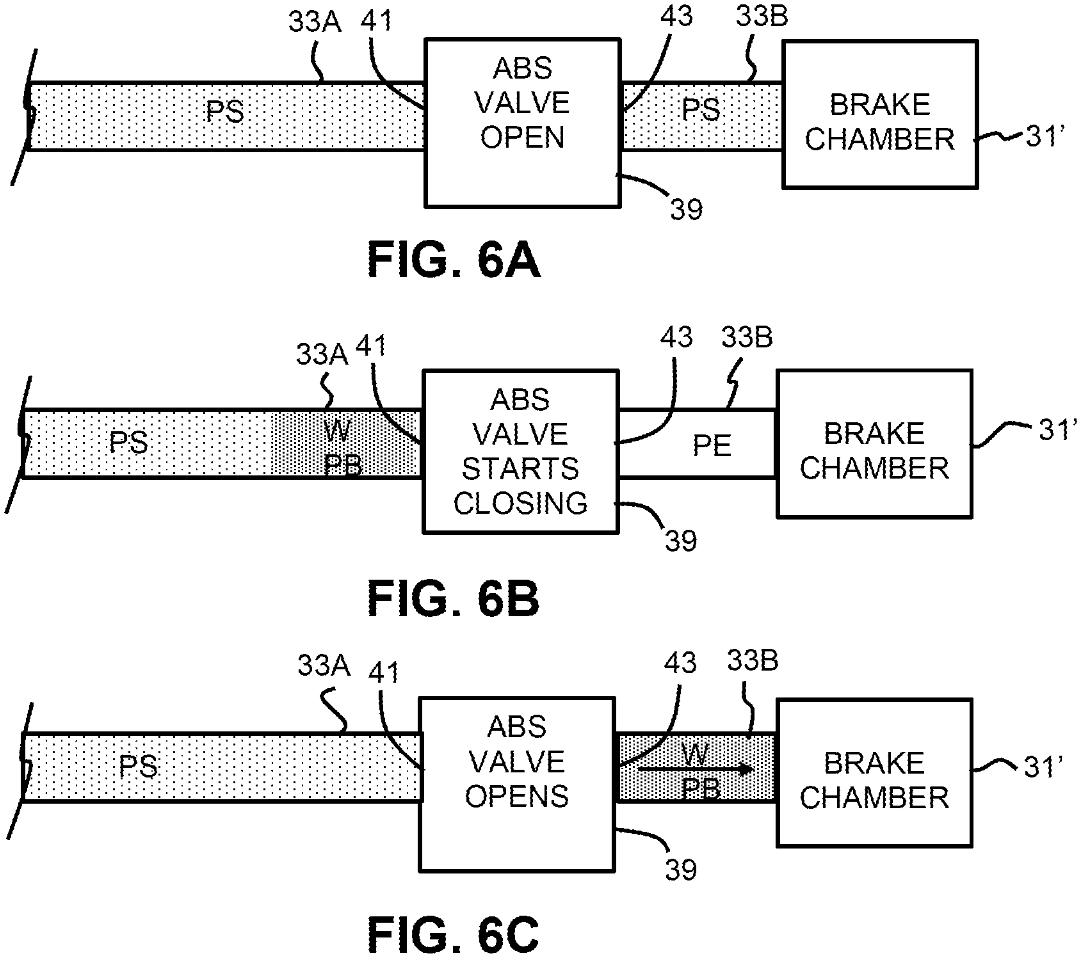
FIGS. 6A-6C schematically illustrate pressure wave movement in a braking arrangement according to an aspect of the present invention upon closure and immediate reopening of an ABV.

FIGS. 6A-6C schematically illustrate significant features of what is understood to happen in the line 33A upstream of the inlet port 41 of the ABV 39 and in the line 33B downstream of the outlet port 43 of the ABV as the ABV closes and then immediately reopens just at the time that a pressure surge to pressure PC occurs at the inlet port 41. In FIGS. 6A-6C, closing of the ABV 39 can be understood to have occurred based on a determination (by the ECU) that slippage is above a predetermined limit.

FIG. 6A shows the ABV 39 before closing when pressure is being supplied to the brake chamber 31' from the source of pressurized air 25 at the pressure PS.

Figures 7A, 7B:
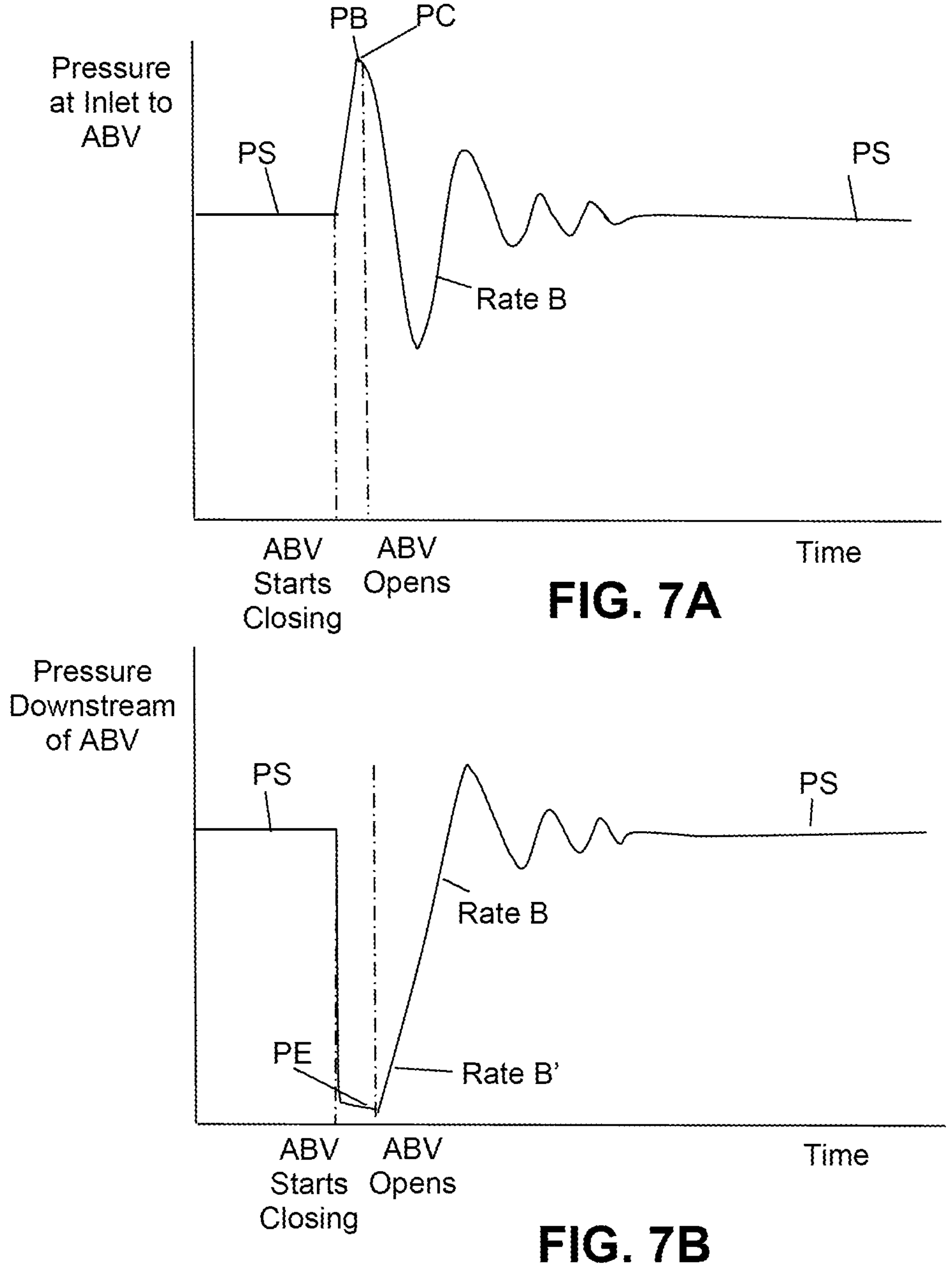
FIGS. 7A and 7B are graphs illustrating pressure versus time at the inlet of an ABV such as is shown in FIGS. 6A-6C and in a line downstream of the ABV, respectively, upon closure and immediate reopening of the ABV.

FIG. 6B shows the ABV 39 after it has just closed. Upon closing of the ABV 39, a pressure surge occurs at the inlet port 41 of the ABV and causes the pressure at the inlet to rise to the closing pressure PC as seen in FIG. 7A. At the same time, the exhaust port 45 (FIG. 2) of the ABV 39 opens and pressure in the line 33B drops to the exhaust pressure PE as seen in FIG. 7B.

Reopening of the ABV 39 as seen in FIG. 6C occurs when it is detected that slippage is below another (but possibly the same) predetermined value and that, as seen in FIG. 7A, pressure at the inlet port 41 of the ABV has, due to starting closure of the ABV, surged to a boosted pressure PB (equal, in this case, to PC) above the pressure PS supplied from the source of pressurized air 25. It will be noted that, in the example of FIGS. 6A-6C and 7A-7B, reopening of the ABV 39 occurs before the wave W with boosted pressure has had any meaningful opportunity to travel upstream and rebound off of a rebound point 57.

Upon reopening of the ABV 39, pressure in the line 33B downstream of the ABV eventually rises to and settles at PS again as seen in FIG. 7B. As seen in FIG. 7A, upon reopening of the ABV 39, there is a pressure drop at the inlet port 41 of the ABV as the pressurized air rushes to the lower pressure region in the line 33B downstream of the ABV. As seen in FIG. 7B, when the ABV reopens, pressure in the line 33B downstream of the ABV starts to rise, initially at a rate B' up until the pressure in the line 33B is substantially equal to the pressure at the inlet port 41 of the ABV and, subsequently, at a rate B that is substantially at the same rate at which pressure rises at the inlet of the ABV. It will be appreciated that rates B' and B are not necessarily constant values but, for purposes of discussion, as they occur over very short periods of time, it will be considered that they are relatively constant. As seen in FIGS. 7A and 7B, after the ABV 39 has reopened, there will ordinarily be some pressure surges and dips at the inlet port 41 of the ABV and in the line 33B downstream of the ABV, with pressure eventually settling down to the pressure PS supplied by the source of pressurized air 25.

Because, in the example of FIGS. 6A-6C and 7A-7B, the ABV 39 is reopened when pressure at the inlet port 41 of the ABV is at the closing pressure PC (equal to PB) above the pressure PS supplied by the source of pressurized air 25, the rate B' at which the line 33B is initially repressurized will be greater than the rate A' at which the line 33B would be repressurized if the ABV were reopened when the pressure at the inlet port of the ABV is substantially equal to the pressure PS. Thus, by appropriate timing of reopening of the ABV 39, it is possible to increase the rate at which the line 33B (and the brake chamber 31') are repressurized, which may be useful in circumstances where, during an ABS operation, it is desired to perform more opening and closing cycles of the ABV, such as when driving on dry asphalt.

FIGS. 8A-8E schematically illustrate significant features of what is understood to happen in the line 33A upstream of the inlet port 41 of the ABV 39 and in the line 33B downstream of the outlet port 43 of the ABV as the ABV closes and reopens and wherein a wave W at a boosted pressure PB that has been generated as the result of closure of the ABV travels upstream and rebounds off a rebound point 57, then travels back downstream toward the inlet port, where the ABV reopens as the wave arrives at the inlet port 41. As in other examples, closing of the ABV 39 can be understood to have occurred based on a determination (by the ECU) that slippage is above a predetermined limit.

Figures 8A, 8B, 8C, 8D, 8E:
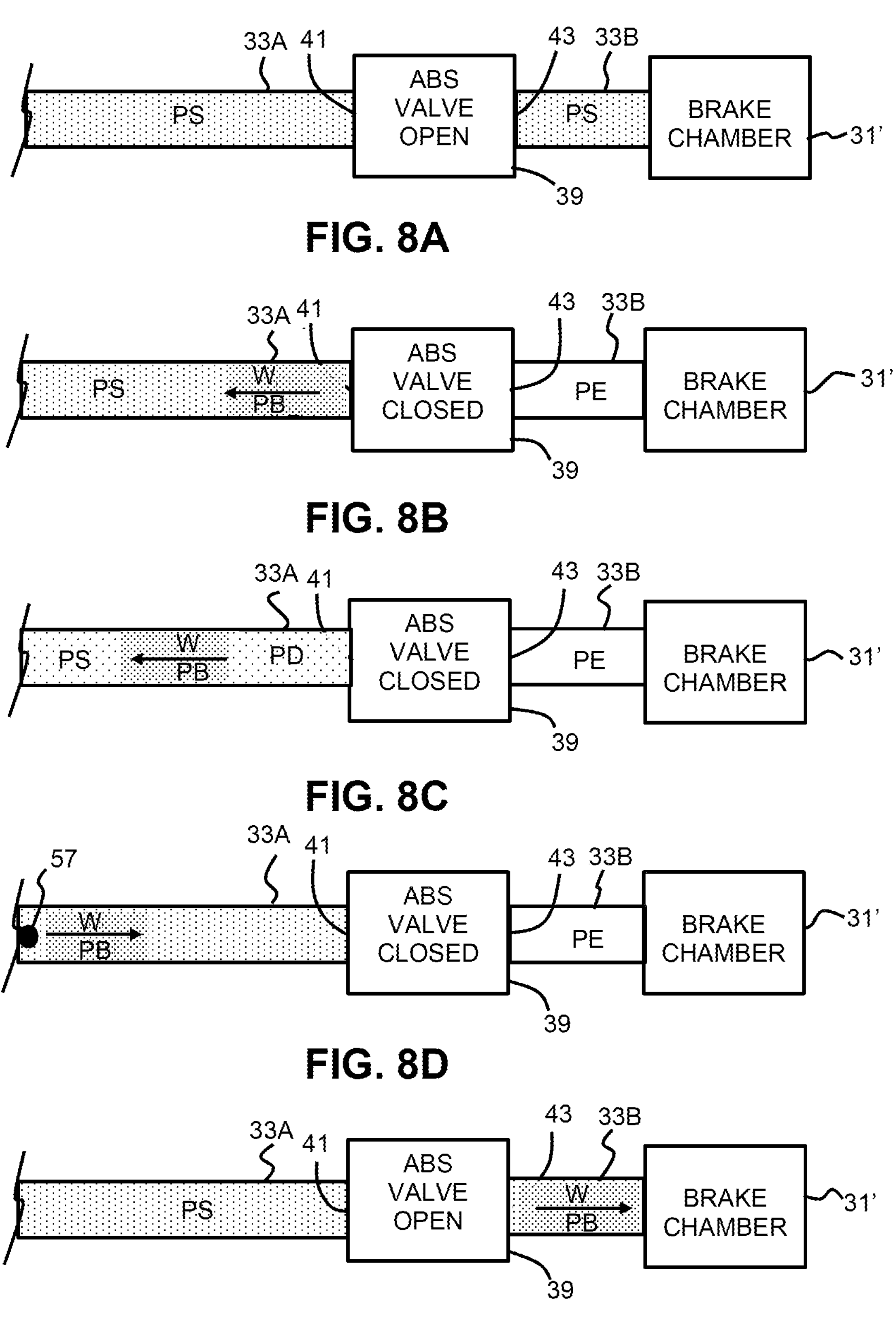
FIGS. 8A-8E schematically illustrate pressure wave movement in a braking arrangement according to an aspect of the present invention upon closure and reopening of an ABV after a pressure wave has rebounded from a rebound point upstream of the ABV.

FIG. 8A shows the ABV 39 before closing when pressure is being supplied to the brake chamber 31' from the source of pressurized air 25 at the pressure PS.

Figure 9A:
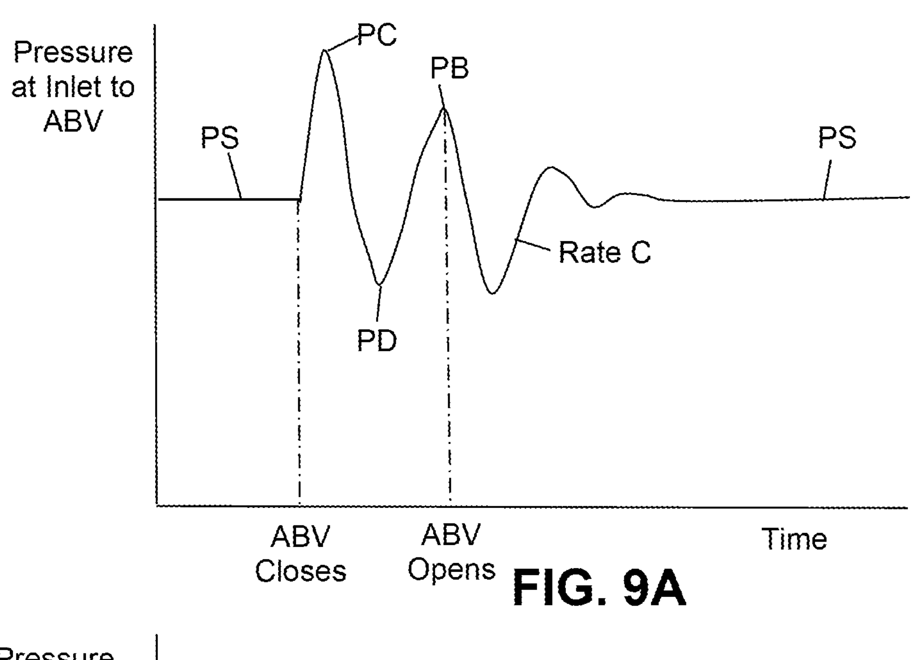
FIGS. 9A and 9B are graphs illustrating pressure versus time at the inlet of an ABV such as is shown in FIGS. 8A-8E and in a line downstream of the ABV, respectively, upon closure and reopening of the ABV after the pressure wave has rebounded from the rebound point upstream of the ABV.
Figure 9B:
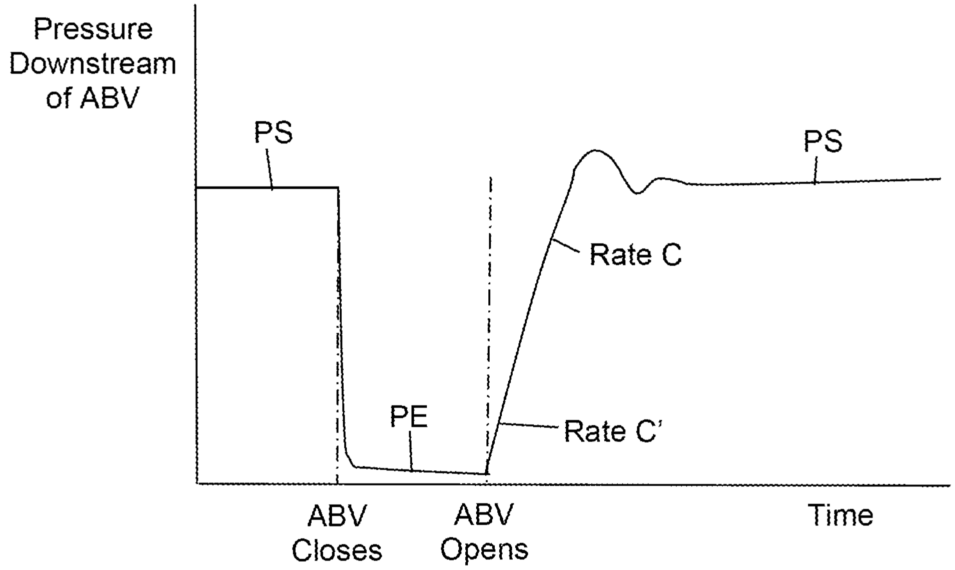

FIG. 8B shows the ABV 39 after it has just closed. Upon closing of the ABV 39, a pressure surge occurs at the inlet port 41 of the ABV and causes the pressure at the inlet to rise to a boosted pressure PB above the pressure PS and initially equal to the closing pressure PC as seen in FIG. 9A. At the same time, the exhaust port 45 (FIG. 2) of the ABV 39 opens and pressure in the line 33B drops to the exhaust pressure PE as seen in FIG. 9B. A wave W at the boosted pressure PB starts traveling upstream toward the source of pressurized air 25.

FIG. 9C shows the ABV 39 as the wave W with boosted pressure PB continues to travel upstream in the line 33A. As the wave W moves away from the inlet port 41 of the ABV, a dip to pressure PD occurs at the inlet port as seen in FIG. 9A.

FIG. 9D shows the ABV 39 as the wave W with boosted pressure PB rebounds off of the rebound point 57 starts to travel downstream in the line 33A toward the inlet port 41. As the wave W moves toward the inlet port 41 of the ABV, a rise to pressure PB occurs at the inlet port as seen in FIG. 9A.

Reopening of the ABV 39 as seen in FIG. 8E occurs when it is detected that slippage is below a desired predetermined value and that, as seen in FIG. 9A, when the wave W at pressure PB reaches the inlet port 41 of the ABV so that pressure at the inlet port has risen to the boosted pressure PB above the pressure PS supplied from the source of pressurized air 25.

Upon reopening of the ABV 39, pressure in the line 33B downstream of the ABV eventually rises to and settles at PS again as seen in FIG. 9B. As seen in FIG. 9A, upon reopening of the ABV 39, there is a pressure drop at the inlet port 41 of the ABV as the pressurized air rushes to the lower pressure region in the line 33B downstream of the ABV. As seen in FIG. 9B, when the ABV reopens, pressure in the line 33B downstream of the ABV starts to rise, initially at a rate C' up until the pressure in the line 33B is substantially equal to the pressure at the inlet port 41 of the ABV and, subsequently, at a rate C that is substantially at the same rate at which pressure rises at the inlet of the ABV. It will be appreciated that rates C' and C are not necessarily constant values but, for purposes of discussion, as they occur over very short periods of time, it will be considered that they are relatively constant. As seen in FIGS. 9A and 9B, after the ABV 39 has reopened, there will ordinarily be some pressure surges and dips at the inlet port 41 of the ABV and in the line 33B downstream of the ABV, with pressure eventually settling down to the pressure PS supplied by the source of pressurized air 25.

Because, in the example of FIGS. 8A-8E and 9A-9B, the ABV 39 is reopened when pressure at the inlet port 41 of the ABV is at the boosted pressure PB above the pressure PS supplied by the source of pressurized air 25, the rate C' at which the line 33B is initially repressurized will be greater than the rate A' at which the line 33B would be repressurized if the ABV were reopened when the pressure at the inlet port of the ABV is substantially equal to the pressure PS. The rate C' at which the line 33B is initially repressurized will ordinarily be less than the rate B' at which the line 33B would be initially repressurized if the ABV were reopened when the pressure at the inlet port of the ABV is substantially equal to the closing pressure PC. Thus, by appropriate timing of reopening of the ABV 39, it is possible to adjust the rate at which the line 33B (and the brake chamber 31') are repressurized to a variety of rates greater than the rate A' at which the line 33B would be repressurized if the ABV were reopened when the pressure at the inlet port of the ABV is substantially equal to the pressure PS, which may be useful in circumstances where, during an ABS operation, it is desired to perform more opening and closing cycles of the ABV, such as when driving on dry asphalt.

FIGS. 10A-10D schematically illustrate significant features of what is understood to happen in the line 33A upstream of the inlet port 41 of the ABV 39 and in the line 33B downstream of the outlet port 43 of the ABV as the ABV closes and reopens and wherein a wave W at a boosted pressure PB that has been generated as the result of closure of the ABV travels upstream, resulting in a dip in pressure to dip pressure PD at the inlet port, where the ABV reopens while pressure at the inlet port is at the dipped pressure. As in other examples, closing of the ABV 39 can be understood to have occurred based on a determination (by the ECU) that slippage is above a predetermined limit.

Figures 10A, 10B, 10C, 10D:
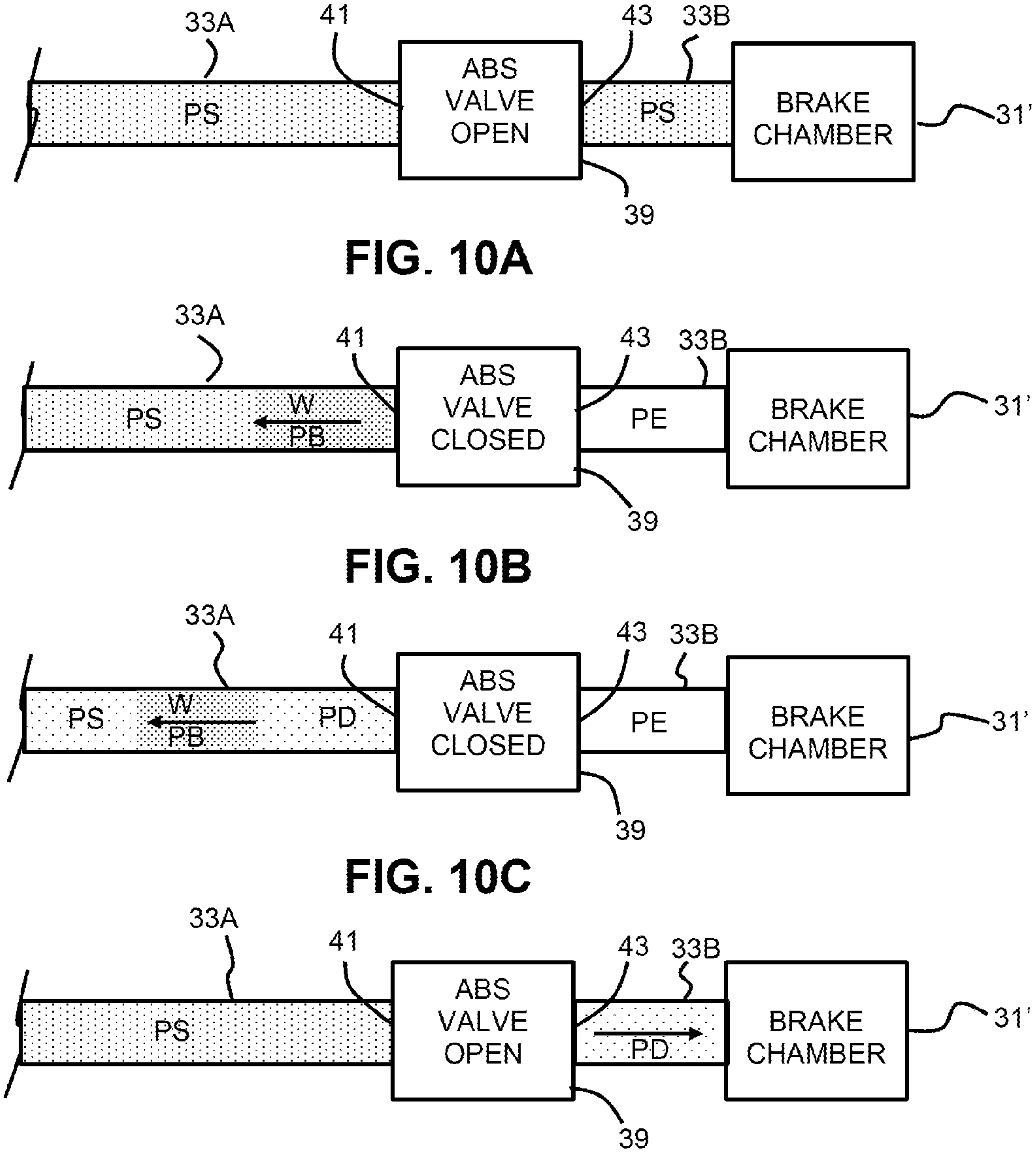
FIGS. 10A-10D schematically illustrate pressure wave movement in a braking arrangement according to an aspect of the present invention upon closure and reopening of an ABV as a pressure wave moves upstream of the ABV.

FIG. 10A shows the ABV 39 before closing when pressure is being supplied to the brake chamber 31' from the source of pressurized air 25 at the pressure PS.

Figures 11A, 11B:
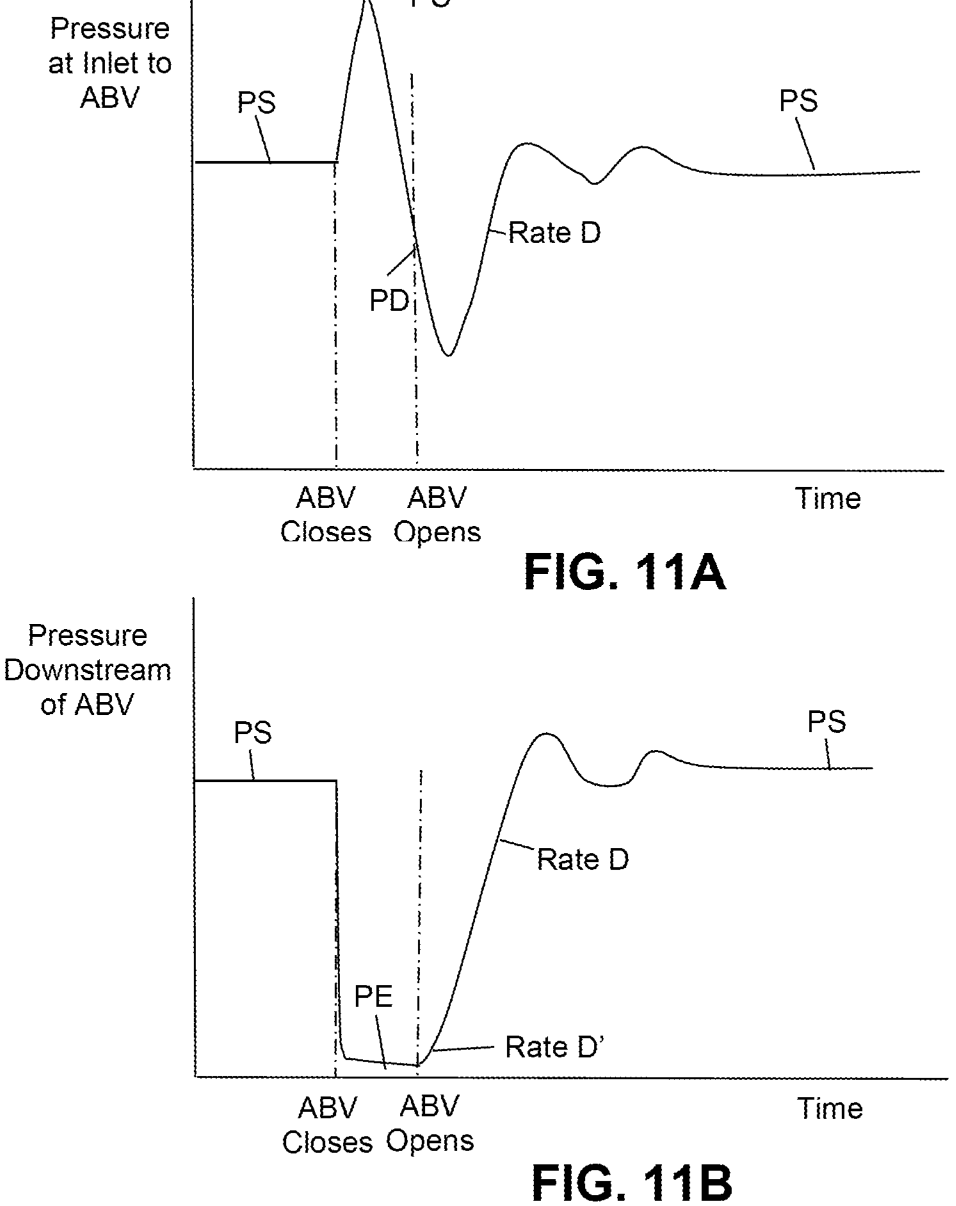
FIGS. 11A and 11B are graphs illustrating pressure versus time at the inlet of an ABV such as is shown in FIGS. 10A-10D and in a line downstream of the ABV, respectively, upon closure and reopening of an ABV as a pressure wave moves upstream of the ABV.

FIG. 10B shows the ABV 39 after it has just closed. Upon closing of the ABV 39, a pressure surge occurs at the inlet port 41 of the ABV and causes the pressure at the inlet to rise to a boosted pressure PB above the pressure PS and initially equal to the closing pressure PC as seen in FIG. 11A. At the same time, the exhaust port 45 (FIG. 2) of the ABV 39 opens and pressure in the line 33B drops to the exhaust pressure PE as seen in FIG. 11B. A wave W at the boosted pressure PB starts traveling upstream toward the source of pressurized air 25.

FIG. 10C shows the ABV 39 as the wave W with boosted pressure PB continues to travel upstream in the line 33A. As the wave W moves away from the inlet port 41 of the ABV, a dip to pressure PD occurs at the inlet port as seen in FIG. 11A.

Figure 1:
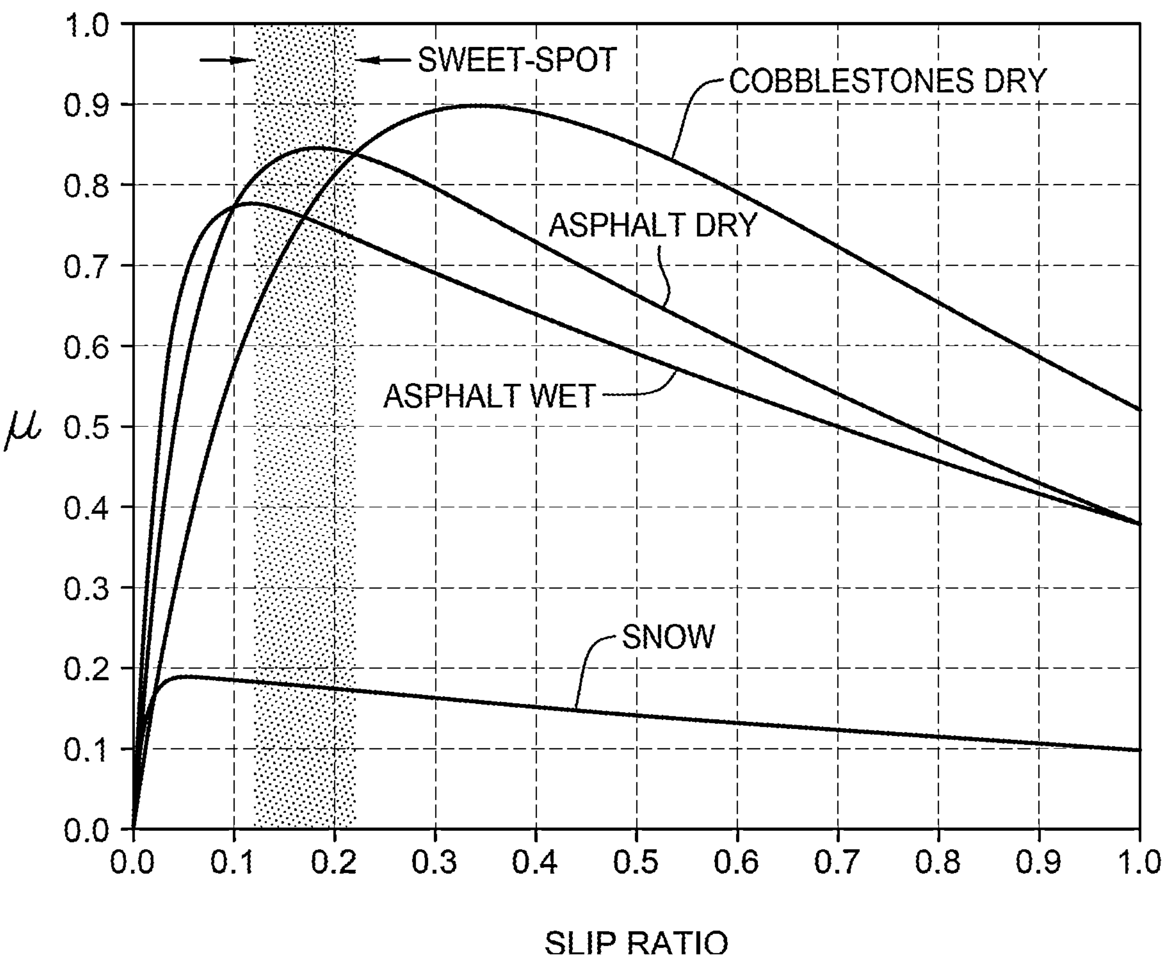
FIG. 1 is a graph of coefficient of friction of a tire and various surfaces versus slip ratio.

Reopening of the ABV 39 as seen in FIG. 10D occurs when it is detected that slippage is below a desired predetermined value and that, as seen in FIG. 1I A, when pressure at the inlet port 41 of the ABV is at the dipped pressure PD below the pressure PS.

Upon reopening of the ABV 39, pressure in the line 33B downstream of the ABV eventually rises to and settles at PS again as seen in FIG. 11B. As seen in FIG. 11A, upon reopening of the ABV 39, there is a pressure drop at the inlet port 41 of the ABV as the pressurized air rushes to the lower pressure region in the line 33B downstream of the ABV. As seen in FIG. 11B, when the ABV reopens, pressure in the line 33B downstream of the ABV starts to rise, initially at a rate D' up until the pressure in the line 33B is substantially equal to the pressure at the inlet port 41 of the ABV and, subsequently, at a rate D that is substantially at the same rate at which pressure rises at the inlet port of the ABV. It will be appreciated that rates D' and D are not necessarily constant values but, for purposes of discussion, as they occur over very short periods of time, it will be considered that they are relatively constant. As seen in FIGS. 11A and 11B, after the ABV 39 has reopened, there will ordinarily be some pressure surges and dips at the inlet port 41 of the ABV and in the line 33B downstream of the ABV, with pressure eventually settling down to the pressure PS supplied by the source of pressurized air 25.

Because, in the example of FIGS. 10A-10D and 11A-11B, the ABV 39 is reopened when pressure at the inlet port 41 of the ABV is at the dipped pressure PD below the pressure PS supplied by the source of pressurized air 25, the rate D' at which the line 33B is initially repressurized will be less than the rate A' at which the line 33B would be repressurized if the ABV were reopened when the pressure at the inlet port of the ABV is substantially equal to the pressure PS. The rate D' at which the line 33B is initially repressurized will also be less than the rates B' (FIG. 7B) or C' (FIG. 9B) at which the line 33B would be initially repressurized if the ABV were reopened when the pressure at the inlet port of the ABV is substantially equal to the closing pressure PC or at a boosted pressure after a wave W has rebounded off of a rebound point. Thus, by appropriate timing of reopening of the ABV 39, it is possible to adjust the rate at which the line 33B (and the brake chamber 31') are repressurized to a rate less than the rate A' at which the line 33B would be repressurized if the ABV were reopened when the pressure at the inlet port of the ABV is substantially equal to the pressure PS, which may be useful in circumstances where, during an ABS operation, it is desired to perform fewer opening and closing cycles of the ABV, such as when driving on wet asphalt or snow when the band of slip ratios over which friction is optimized is relatively small and conventional operation might result in excessive cycling of the ABV and failure to fully pressurize the brake chamber. In such circumstances, during ABS operation, it may be desirable to increase the pressure slower than usual at the outlet of ABV or chamber, such as when driving on wet asphalt or snow when the band of slip ratio over which friction is optimized is relatively small and lower (5% in snow and ice while normal is 18%) than usual. This will eventually result is lower cycles and ensuring the friction is utilized efficiently without reaching the unstable zone prematurely.

The examples discussed in FIGS. 4A-11B considered opening the ABV 39 when pressure at the inlet port 41 of the ABV is at a peak boosted pressure (e.g., PC or PB), at a minimal dip pressure PD, or at the same pressure as the pressure PS supplied from the source of pressurized air 25. It will be appreciated that opening of the ABV 39 can be timed to open or close at any points between the maximum and minimum possible values by identifying the time at which the pressure at the inlet port 41 is at a desired level to obtain desired rate of brake chamber pressurization characteristics for the ABS. Additionally, a boost pressure PB or a dip pressure PD or, indeed, any pressure at the inlet port 41 of the ABV 39 need not be the pressure (PC) that results from closure of the ABV before a wave W has started to travel upstream, the pressure (PD) that results from a dip as the first wave starts moving away from the inlet port, or the pressure (PB) that occurs as the first wave rebounds off the rebound point 57 and travels back toward the inlet port. Instead, the boosted, dip, or other pressure may be a pressure that occurs via a second or later wave that follows the first wave.

The ECU 55 may be configured to adjust opening timing of the ABV 39 and, thus, rate of repressurization of the brake chamber 31' based on road conditions. The ECU 55 may, for example, be set to provide a particular opening timing of the ABV 39 and rate of repressurization of the brake chamber 31' based on expected typical road conditions for a given vehicle, i.e. a predetermined friction coefficient. Additionally or alternatively, one or more various suitable sensors 63 (FIG. 2) can be provided to determine or estimate road conditions and estimate coefficient of friction (U.S. Pat. No. 10,953,887 is illustrative of various technologies available for estimating road conditions and is incorporated by reference) and the ECU 55 may be configured to adjust opening timing of the ABV 39 and rate of repressurization of the brake chamber 31' in response to detected road conditions. The ECU 55 may, for example, be configured to, initially, provide a particular opening timing of the ABV 39 and rate of repressurization of the brake chamber 31' based on expected typical road conditions for the vehicle and, after different road conditions are detected, adjust opening timing of the ABV 39 and rate of repressurization of the brake chamber 31' in response to the detected road conditions Instead of or in addition to attempting to directly determine or estimate tire/road friction, the ECU 55 may be configured to adjust opening timing of the ABV 39 and, thus, rate of repressurization of the brake chamber 31', as a function of wheel slip information and braking pressure and torque, and/or as a function of wheel slip information and transmission driving torque. When wheel slippage is minimal at high brake pressure and torque, the ECU 55 may adjust opening timing of the ABV 39 to increase the rate at which the brake chamber 31' is pressurized, while, if greater than desired wheel slippage occurs at low brake pressure and torque, or at low driving torque, the ECU may adjust opening timing of the ABV to decrease the rate at which the brake chamber is pressurized.

As shown from the examples provided in FIGS. 4A-11B, in the braking arrangement 23 shown in FIG. 2 for the vehicle 21 that includes the source of pressurized air 25 for supplying pressurized air, the wheel 27 comprising a tire 27', the pneumatic brake arrangement 29 that comprises a brake chamber 31' and a brake 31, the ABV 39 in the line 33A and 33B between the brake chamber and the source of pressurized air, the ABV opening to connect the brake chamber to the source of pressurized air and closing to disconnect the brake chamber from the source of pressurized air, and the ECU 55 configured to open and close the ABV during the anti-lock braking operation, the ECU can be configured to set or adjust a rate at which pressure in the brake chamber is increased during the anti-lock braking operation by adjusting opening timing of the ABV.

The braking arrangement 23 can include the sensor 63 configured to estimate a friction coefficient between the tire and a surface on which the tire is driven, and the ECU can be configured to set or adjust the rate at which pressure in the brake chamber is increased during the anti-lock braking operation by adjusting opening timing of the ABV as a function of an estimated friction coefficient. The ECU 55 can further be configured, prior to adjusting the rate at which pressure in the brake chamber 31' is increased during the anti-lock braking operation by adjusting opening timing of the ABV 39 as a function of an estimated friction coefficient, to open and close the ABV during the anti-lock braking operation according to a predetermined opening timing of the ABV established as function of a predetermined friction coefficient. The ECU 55 may, for example, be configured to increase the rate at which pressure in the brake chamber 31' is increased during the anti-lock braking operation in response to an estimation by the sensor 63 of the estimated friction coefficient above the predetermined friction coefficient as described in connection with, e.g., FIGS. 6A-9B. The ECU 55 may alternatively or in addition be configured to decrease the rate at which pressure in the brake chamber 31' is increased during the anti-lock braking operation in response to the estimated friction coefficient below the predetermined friction coefficient as described in connection with FIGS. 10A-11B.

The ECU 55 can be configured to increase the rate at which pressure in the brake chamber 31' is increased during the anti-lock braking operation by adjusting opening timing of the ABV 39 in a first mode so that a pressure wave generated in the line upstream of the inlet to the ABV when the ABV closes and above a pressure at which air is supplied at the inlet 41 to the ABV by the source of pressurized air 25 is at (e.g., FIGS. 6A-7B), or approaching or arriving (e.g., FIGS. 8A-9B) at the inlet to the ABV when the ABV is opened. Opening timing of the ABV 39 in the first mode may be a function of a length of the line between the inlet port 41 to the ABV and the rebound point 57 at which the pressure wave generated in the line upstream of the inlet to the ABV stops traveling upstream away from the inlet port to the ABV and starts traveling downstream toward the ABV. The ECU 55 may be configured to adjust opening timing of the ABV 39 in the first mode when a friction coefficient between the tire 27' and a surface in contact with the tire is above a first predetermined friction level.

The ECU 55 can also or alternatively be configured to decrease the rate at which pressure in the brake chamber 31' is increased during the anti-lock braking operation by adjusting opening timing of the ABV 39 in a second mode (e.g., FIGS. 10A-11B) so that the pressure wave generated in the line upstream of the inlet port to the ABV when the ABV closes is moving away from the inlet port 41 and a pressure below the pressure at which air is supplied at the inlet port to the ABV by the source of pressurized air 25 is present at the inlet port to the ABV when the ABV is reopened. The ECU 55 can be configured to adjust opening timing of the ABV 39 in the second mode when a friction coefficient between the tire 27' and a surface in contact with the tire is below a second predetermined friction level.

The ECU 55 may also be configured to adjust opening timing of the ABV 39 in the first mode or the second mode as a function of wheel slip information and braking pressure and torque and/or as a function of wheel slip information and transmission driving torque.

In a method for changing performance of a braking arrangement for a vehicle according to an aspect of the invention, the ABV 39 is opened and closed during an anti-lock braking operation to supply and stop supplying, respectively, air from the source of pressurized air 25 to the brake chamber 31', and a rate at which pressure in the brake chamber is increased during the anti-lock braking operation is adjusted by adjusting opening timing of the ABV. The rate at which pressure in the brake chamber 31' is increased during the anti-lock braking operation by adjusting opening timing of the ABV can be adjusted as a function of an estimated friction coefficient estimated by a suitable sensor or sensor(s) arrangement 63.

Prior to adjusting the rate at which pressure in the brake chamber 31' is increased during the anti-lock braking operation by adjusting opening timing of the ABV 39 as a function of an estimated friction coefficient, opening and closing the ABV during the anti-lock braking operation can be adjusted according to a predetermined opening timing of the ABV established as function of a predetermined friction coefficient. The rate at which pressure in the brake chamber 31' is increased during the anti-lock braking operation can be increased in response to an estimation by the sensor 63 of the estimated friction coefficient being above the predetermined friction coefficient. Alternatively, or in addition, the rate at which pressure in the brake chamber 31' is increased during the anti-lock braking operation can be decreased in response to the estimated friction coefficient being below the predetermined friction coefficient.

The rate at which pressure in the brake chamber 31' is increased during the anti-lock braking operation by adjusting opening timing of the ABV 39 can be adjusted in a first mode so that a pressure wave generated in the line upstream of the inlet port 41 to the ABV when the ABV closes and above a pressure at which air is supplied at the inlet port to the ABV by the source of pressurized air 25 is at, or approaching, or arriving at the inlet port to the ABV when the ABV is opened. Alternatively, or in addition, the rate at which pressure in the brake chamber 31' is increased during the anti-lock braking operation by adjusting opening timing of the ABV can be adjusted in a second mode so that the pressure wave generated in the line upstream of the inlet port 41 to the ABV 39 when the ABV closes is moving away from the inlet port to the ABV is opened and a pressure below the pressure at which air is supplied at the inlet port to the ABV by the source of pressurized air 25 is present at the inlet port to the ABV.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A braking arrangement for a vehicle, comprising:

a source of pressurized air for supplying pressurized air;

a wheel comprising a tire and a first pneumatic brake arrangement, the first pneumatic brake arrangement including a brake chamber and a brake;

an anti-lock brake valve (ABV) in a line between the brake chamber and the source of pressurized air, the ABV opening to connect the brake chamber to the source of pressurized air and closing to disconnect the brake chamber from the source of pressurized air; and an electronic control unit (ECU) configured to open and close the ABV during an anti-lock braking operation, the ECU being configured to open the ABV during the anti-lock braking operation in response to a pressure at an inlet port of the ABV and a slippage between the tire and a road surface;

wherein the ECU is configured to adjust an opening timing of the ABV relative to a pressure wave generated in the line when the ABV closes, the adjustment being a function of an estimated friction coefficient between the tire and the road surface, such that:

in a first mode, the ECU opens the ABV when the pressure wave is at or arriving at the inlet port; and in a second mode, the ECU opens the ABV when the pressure wave is moving away from the inlet port.

2. The braking arrangement of claim 1, the braking arrangement comprising a sensor configured to estimate a friction level between the tire and a surface on which the tire is driven, wherein the ECU is configured to set or adjust the rate at which pressure in the brake chamber is increased during the anti-lock braking operation by adjusting opening timing of the ABV as a function of an estimated friction level.

3. The braking arrangement of claim 2, wherein the ECU is configured to, prior to adjusting the rate at which pressure in the brake chamber is increased during the anti-lock braking operation by adjusting opening timing of the ABV as a function of an estimated friction coefficient, open and close the ABV during the anti-lock braking operation according to a predetermined opening timing of the ABV established as function of a predetermined friction coefficient.

4. The braking arrangement of claim 3, wherein the ECU is configured to increase the rate at which pressure in the brake chamber is increased during the anti-lock braking operation in response to an estimation by the sensor of the estimated friction coefficient above the predetermined friction coefficient.

5. The braking arrangement of claim 4, wherein the ECU is configured to decrease the rate at which pressure in the brake chamber is increased during the anti-lock braking operation in response to the estimated friction coefficient below the predetermined friction coefficient.

6. The braking arrangement of claim 3, wherein the ECU is configured to decrease the rate at which pressure in the brake chamber is increased during the anti-lock braking operation in response to the estimated friction coefficient below the predetermined friction coefficient.

7. The braking arrangement of claim 1, wherein the ECU is configured to increase the rate at which pressure in the brake chamber is increased during the anti-lock braking operation by adjusting opening timing of the ABV in a first mode so that a pressure wave generated in the line upstream of the inlet port to the ABV when the ABV closes and above a pressure at which air is supplied at the inlet port to the ABV by the source of pressurized air is at, or approaching or arriving at the inlet port to the ABV when the ABV is opened.

8. The braking arrangement of claim 7, wherein opening timing of the ABV in the first mode is a function of length of the line between the inlet port to the ABV and a rebound point at which the pressure wave generated in the line upstream of the inlet port to the ABV stops traveling upstream away from the inlet port to the ABV and starts traveling downstream toward the ABV.

9. The braking arrangement of claim 7, wherein the ECU is configured to decrease the rate at which pressure in the brake chamber is increased during the anti-lock braking operation by adjusting opening timing of the ABV in a second mode so that the pressure wave generated in the line upstream of the inlet port to the ABV when the ABV closes is moving away from the inlet port to the ABV is opened and a pressure below the pressure at which air is supplied at the inlet port to the ABV by the source of pressurized air is present at the inlet port to the ABV.

10. The braking arrangement of claim 9, wherein the ECU is configured to adjust opening timing of the ABV in the first mode when a friction coefficient between the tire and a surface in contact with the wheel is above a first predetermined friction level.

11. The braking arrangement of claim 10, wherein the ECU is configured to adjust opening timing of the ABV in the second mode when a friction coefficient between the tire and a surface in contact with the tire is below a second predetermined friction level.

12. The braking arrangement of claim 9, wherein the ECU is configured to adjust opening timing of the ABV in the first mode or the second mode as a function of wheel slip information and braking pressure and torque.

13. The braking arrangement of claim 7, wherein the ECU is configured to adjust opening timing of the ABV in the first mode when a friction coefficient between the tire and a surface in contact with the tire is above a first predetermined friction level.

14. The braking arrangement of claim 1, wherein the ECU is configured to decrease the rate at which pressure in the brake chamber is increased during the anti-lock braking operation by adjusting opening timing of the ABV in a mode so that a pressure wave generated in the line upstream of the inlet port to the ABV when the ABV closes is moving away from the inlet port to the ABV is opened and a pressure below the pressure at which air is supplied at the inlet port to the ABV by the source of pressurized air is present at the inlet port to the ABV.

15. The braking arrangement of claim 14, wherein the ECU is configured to adjust opening timing of the ABV in the second mode when a friction coefficient between the tire and a surface in contact with the tire is below a second predetermined friction level.

16. A method for changing performance of a braking arrangement for a vehicle, the vehicle and braking arrangement comprising a source of pressurized air for supplying pressurized air, a wheel comprising a tire and a first pneumatic brake arrangement, the first pneumatic brake arrangement including a brake chamber and a brake, and an anti-lock brake valve (ABV) in a line between the brake chamber and the source of pressurized air, the ABV opening to connect the brake chamber to the source of pressurized air and closing to disconnect the brake chamber from the source of pressurized air, the method comprising:

opening and closing the ABV during an anti-lock braking operation to supply and stop supplying, respectively, air from the source of pressurized air to the brake chamber; and opening the ABV during the anti-lock braking operation in response to a pressure at an inlet port of the ABV and a slippage between the tire and a road surface;

wherein the method is adjusting an opening timing of the ABV relative to a pressure wave generated in the line when the ABV closes, the adjustment being a function of an estimated friction coefficient between the tire and the road surface, such that:

in a first mode, opening the ABV when the pressure wave is at or arriving at the inlet port; and in a second mode, opening the ABV when the pressure wave is moving away from the inlet port.

17. The method of claim 16, wherein the vehicle and the braking arrangement comprise a sensor configured to estimate a friction level between the tire and a surface on which the tire is driven, the method comprising adjusting the rate at which pressure in the brake chamber is increased during the anti-lock braking operation by adjusting opening timing of the ABV as a function of an estimated friction level.

18. The method of claim 17, further comprising, prior to adjusting the rate at which pressure in the brake chamber is increased during the anti-lock braking operation by adjusting opening timing of the ABV as a function of an estimated friction coefficient, opening and closing the ABV during the anti-lock braking operation according to a predetermined opening timing of the ABV established as function of a predetermined friction coefficient.

19. The method of claim 18, further comprising increasing the rate at which pressure in the brake chamber is increased during the anti-lock braking operation in response to an estimation by the sensor of the estimated friction coefficient being above the predetermined friction coefficient.

20. The method of claim 18, further comprising decreasing the rate at which pressure in the brake chamber is increased during the anti-lock braking operation in response to the estimated friction coefficient being below the predetermined friction coefficient.

21. The method of claim 16, further comprising increasing the rate at which pressure in the brake chamber is increased during the anti-lock braking operation by adjusting opening timing of the ABV in a first mode so that a pressure wave generated in the line upstream of the inlet port to the ABV when the ABV closes and above a pressure at which air is supplied at the inlet port to the ABV by the source of pressurized air is at, or approaching, or arriving at the inlet port to the ABV when the ABV is opened.

22. The method of claim 16, further comprising decreasing the rate at which pressure in the brake chamber is increased during the anti-lock braking operation by adjusting opening timing of the ABV in a second mode so that the pressure wave generated in the line upstream of the inlet port to the ABV when the ABV closes is moving away from the inlet port to the ABV is opened and a pressure below the pressure at which air is supplied at the inlet port to the ABV by the source of pressurized air is present at the inlet port to the ABV.

* * * * *